(12) United States Patent
You et al.

(10) Patent No.: US 12,512,701 B2
(45) Date of Patent: Dec. 30, 2025

(54) WIRELESS POWER TRANSMISSION SYSTEM FOR OPTIMAL POWER TRANSMISSION, AND METHOD FOR CONTROLLING OPTIMAL RESONANCE FREQUENCY OF SAME SYSTEM

(71) Applicant: BANF CO., LTD., Seoul (KR)

(72) Inventors: Sung Han You, Seoul (KR); Young Sun Kim, Gunpo (KR)

(73) Assignee: BANF CO., LTD., Seoul (KR)

( * ) Notice: Subject to any disclaimer, the term of this patent is extended or adjusted under 35 U.S.C. 154(b) by 0 days.

(21) Appl. No.: 18/868,766

(22) PCT Filed: Jun. 2, 2023

(86) PCT No.: PCT/KR2023/007600
§ 371 (c)(1),
(2) Date: Nov. 24, 2024

(87) PCT Pub. No.: WO2024/029712
PCT Pub. Date: Feb. 8, 2024

(65) Prior Publication Data
US 2025/0350150 A1 Nov. 13, 2025

(30) Foreign Application Priority Data
Aug. 3, 2022 (KR) .................. 10-2022-0096990

(51) Int. Cl.
*H02J 50/12* (2016.01)
*B60C 23/04* (2006.01)
(Continued)

(52) U.S. Cl.
CPC .......... *H02J 50/12* (2016.02); *B60C 23/0413* (2013.01); *B60C 23/0488* (2013.01);
(Continued)

(58) Field of Classification Search
CPC . H02J 50/12; H02J 50/70; H02J 50/80; B60C 23/0413; B60C 23/0488; H01F 27/366
See application file for complete search history.

(56) References Cited

U.S. PATENT DOCUMENTS

| 2013/0249306 A1* | 9/2013 | Kim | .................. H02J 50/50 307/104 |
| 2014/0077614 A1* | 3/2014 | Park | .................. H02J 50/90 307/104 |

(Continued)

FOREIGN PATENT DOCUMENTS

| KR | 10-2012-0124732 A | 11/2012 |
| KR | 10-2013-0033332 A | 4/2013 |

(Continued)

*Primary Examiner* — Lincoln D Donovan
*Assistant Examiner* — Alex W Lam
(74) *Attorney, Agent, or Firm* — Harvest IP Law, LLP

(57) ABSTRACT

The present invention relates to a design of a wireless power transmission system and a method for controlling an optimal resonance frequency applied to the system, and provides a wireless power transmission system and a method for controlling an optimal resonance frequency applied to the system, wherein, by a method of designing a power transmission unit to match a frequency control range and by designing a quality factor (Q) of a resonance unit of a power reception unit to be low so that the difference in power reception performance is not large within the control frequency range, power can be received stably even if there is a change in resonance frequencies of a wireless power transmission system installed in a metal environment, and the system frequency can be easily and quickly controlled so as to search for and find the optimal resonance frequency.

10 Claims, 11 Drawing Sheets

(51) Int. Cl.
    *H01F 27/36*     (2006.01)
    *H02J 50/70*     (2016.01)
    *H02J 50/80*     (2016.01)

(52) U.S. Cl.
    CPC ............ *H01F 27/366* (2020.08); *H02J 50/70* (2016.02); *H02J 50/80* (2016.02)

(56) References Cited

U.S. PATENT DOCUMENTS

2016/0056638 A1\*   2/2016   Hatanaka ................ H02J 50/12
                                                                   307/104
2018/0115197 A1\*   4/2018   Li ........................... H02J 50/80

FOREIGN PATENT DOCUMENTS

| KR | 10-2013-0107955 A | 10/2013 |
| KR | 10-2017-0055595 A | 5/2017 |
| KR | 10-2351949 B1 | 1/2022 |

\* cited by examiner

WIRELESS POWER TRANSMISSION SYSTEM FOR OPTIMAL POWER TRANSMISSION, AND METHOD FOR CONTROLLING OPTIMAL RESONANCE FREQUENCY OF SAME SYSTEM

CROSS REFERENCE TO RELATED APPLICATION(S)

This application is a National Stage of International Application No. PCT/KR2023/007600 filed on Jun. 2, 2023, claiming priority based on Korean Patent Application No. 10-2022-0096990 filed on Aug. 3, 2022, the disclosures of which are incorporated herein by reference in their entirety.

TECHNICAL FIELD

The present invention relates to a wireless power transfer system and a method of controlling an optimal resonance frequency of the system. More specifically, the present invention relates to a wireless power transfer system for optimal power transfer, which may stably receive power and efficiently, easily, and quickly control a system frequency to search for an optimal resonance frequency, and a method of controlling the optimal resonance frequency applied thereto.

BACKGROUND ART

Wireless power transfer refers to technology that supplies power to home appliances or electric vehicles wirelessly instead of using conventional wired power lines, and research related thereto has actively been conducted due to an advantage of allowing wireless charging of a device that requires power using a power cable without connecting the device to a power outlet.

Wireless power transfer technologies are broadly divided into an electromagnetic induction method, a magnetic resonance method, and a microwave method. The electromagnetic induction method is technology that utilizes electromagnetic inductive coupling between coils in close proximity. In the electromagnetic induction method, a distance between two transmitting and receiving coils is within several centimeters, and transmission efficiency is greatly affected by arrangement conditions of the two coils. The magnetic resonance method is technology in which non-radiative magnetic field energy is transferred between two resonators separated from each other by resonant coupling. The magnetic resonance method has advantages in that wireless power transfer is possible even when a distance between the transmitting and receiving coils is about 1 to 2 meters, alignment of the two coils is relatively flexible compared to magnetic induction, and an allowable wireless charging range may be extended using a relay method. The microwave method is technology that transmits power by radiating ultra-high frequency electromagnetic waves, such as microwaves, through an antenna. In the microwave method, even though long-distance wireless power transfer is possible, safety issues due to electromagnetic waves need to be considered.

A wireless power transfer system includes a wireless power transfer device that wirelessly transmits power and a wireless power reception device that wirelessly receives power. In general, maximum power transfer of the wireless power transfer system is possible when the wireless power transfer device and the wireless reception device have the same resonance frequency.

That is, even though a magnetic resonance wireless power transfer system may maximize transmission efficiency through a magnetic resonance effect even when coupling between the transmitting and receiving coils is small, there is a problem in that transmission efficiency rapidly decreases when a resonance condition is not satisfied.

In addition, currently, the electromagnetic induction method is being commercialized mainly in small home appliances (mobile phones, earphones, tablets, etc.), and the magnetic resonance method is being applied and attempted in products that require large gaps and high power (automobiles, large home appliances, motors, etc.).

Due to high convenience and safety compared to a wired transmission method, wireless power transfer technology has widely been applied to a wide range of products from small, low-power home appliances to high-power products such as electric vehicles, and many products have already been released.

However, even though the electromagnetic induction method has many commercialized cases, there are limitations in increasing a transmission distance. Even though the magnetic resonance method may ensure high transmission efficiency using a resonance phenomenon despite a relatively long transmission distance, a transmission efficiency deviation is significantly large depending on whether a resonance condition is satisfied.

In particular, even though a resonance condition for a transmitter and a receiver may be derived from a mathematical theoretical solution, when locations of the transmitter and the receiver and a distance between the transmitter and the receiver change, coupling effect varies, and the resonance condition changes accordingly. In the case of the magnetic resonance method, transmission efficiency rapidly decreases when the resonance condition is not satisfied. Therefore, a system and a method are required to be able to search for an optimal resonance frequency for optimal power transfer according to a change in a transmission distance.

Magnetic resonance power transfer has great potential and necessity for application in power transfer between two objects disposed in close proximity where power supply is required even though wired power supply or battery replacement is difficult.

In addition, magnetic resonance power transfer causes a phenomenon in which a physical resonance frequency of the transmitter changes depending on whether a metal material is present near the transmitter or the distance between the metal material and the transmitter, etc. when the metal material is present.

In particular, in an environment where there is a metal material near the transmitter and a distance to the metal material continuously changes, a resonance frequency may also continuously change, and in this case, stable power transfer may become difficult.

Therefore, there is a need for a wireless power method that may maintain wireless power transfer performance even when the resonance frequency changes due to the presence or absence of the metal material near the transmitter of the wireless power transfer system or the change in the distance to the metal material.

DISCLOSURE

Technical Problem

A task to be solved by the present invention is to provide a wireless power transfer system capable of stably receiving power despite a change in a resonance frequency of a wireless power transfer system installed in an environment (referred to hereinafter as "metal environment") in which a metal material is present around a part except for a wireless power transfer plane defined by a direction in which a transmitter and a receiver face each other to transmit wireless power, and capable of searching for and finding an optimal resonance frequency by easily and rapidly controlling a system frequency, and a method of controlling the optimal resonance frequency applied to the system.

In addition, a task to be solved by the present invention is to provide a wireless power transfer system capable of improving stability and efficiency of wireless power transfer by minimizing an influence of a metal environment and capable of facilitating receiver circuit design since component selection is easy, and a method of controlling an optimal resonance frequency applied to the system.

In addition, a task to be solved by the present invention is to provide a wireless power transfer system for efficient and optimal power transfer applicable to various systems or home appliances in an environment in which a resonance frequency changes due to a metal environment or an environment in which a transmission distance changes, and a method of controlling an optimal resonance frequency applied to the system.

Technical Solution

To solve the above-mentioned tasks, the present invention may provide a wireless power transfer system for optimal power transfer using magnetic resonant coupling in which a metal object is provided near a transmitter, the wireless power transfer system including the transmitter configured to transmit power by including an AC/DC conversion circuit, a DC/RF conversion circuit, a matching circuit, a transmitting coil, a control circuit, and a communication circuit, and a receiver configured to receive power by including a receiving coil, a matching circuit, a rectifier circuit, a stabilization circuit, a DC/DC conversion circuit, a control circuit, and a communication circuit, wherein the system is configured to control reception power of the receiver by controlling a frequency of transmission power from the transmitter, and a resonance unit of the receiver including the receiving coil and the matching circuit of the receiver is designed so that a Q (quality factor)-value of the resonance unit defined by Mathematical Formula 1 is less than a preset value.

$$Q = \frac{f_{resonance\ frequency}}{f_2 - f_1}$$ [Mathematical Formula 1]

The Q-value is a full width at half maximum (FWHM), and is defined as a value obtained by dividing a resonance frequency by a frequency (f2, f1) width at half a maximum power transmission/reception performance value shown at the resonance frequency.

In addition, the transmitter may be mounted below a wheel housing of a vehicle, the receiver may be mounted inside a tire of the vehicle mounted on a side of the wheel housing to supply power to a sensor module mounted inside the tire, and the metal object may be disposed in a region excluding a wireless power transfer space of the transmitter with respect to the receiver.

Further, the sensor module may be an acceleration sensor, a temperature sensor, or an air pressure sensor.

Here, the Q-value of the resonance unit of the receiver may be set to less than 100, and a Q-value of a resonance unit including the transmitting coil and the matching circuit of the transmitter may be set to 100 or more.

In this case, both the Q-value of the resonance unit of the receiver and a Q-value of a resonance unit including the transmitting coil and the matching circuit of the transmitter may be set to less than 100.

Further, a shielding member made of ferrite may be attached between the metal object and the transmitter.

In addition, to solve the above-mentioned tasks, the present invention provides a method of controlling a frequency for optimal power transfer for controlling the wireless power transfer system for optimal power transfer described above, the method including a step (a) of calculating an operating range of a system resonance frequency variation value of a transmitter included in the wireless power transfer system, a step (b) of setting a driving resonance frequency start value of the transmitter and driving the transmitter using the resonance frequency start value, a step (c) of driving the transmitter, measuring an output voltage of the receiver, and comparing the measured output voltage with a predetermined receiver voltage reference value, and a step (d) of determining an optimal resonance frequency to perform driving while sequentially incrementing or decrementing a driving resonance frequency of the transmitter until a resonance frequency at a moment when the output voltage of the receiver becomes less than the voltage reference value is determined as an optimal resonance frequency when the output voltage of the receiver is greater than the voltage reference value.

In addition, the method may further include a step (e) of measuring an output voltage of the receiver and a deviation of the output voltage by performing driving while sequentially inversely incrementing or decrementing a driving resonance frequency of the transmitter from the optimal resonance frequency determined in the step (d), and a step (f) of comparing the output deviation with a predetermined reference deviation.

Here, when the output deviation is greater than the reference deviation, a start value may be set again, and the step (d) of driving the transmitter using the resonance frequency start value and subsequent steps may be repeated.

In this case, a transmission current value may be measured in the step (b) of sequentially driving the transmitter according to the frequency using the start value resonance frequency, an output current of the receiver may be measured in the step (c), and whether transmission efficiency of the transmitter is maximum may be determined in a process of comparing the output voltage of the receiver with the predetermined receiver voltage reference value.

Advantageous Effects

According to a wireless power transfer system for optimal power transfer and a method of controlling an optimal resonance frequency using the system according to the invention, there are provided a wireless power transfer system a method of controlling an optimal resonance frequency applied to the system capable of stably receiving power by designing Q (quality factor) of a receiver resonance unit to be low even when a resonance frequency of the wireless power transfer system installed in a metal environment changes, and capable of searching for and finding an optimal resonance frequency by easily and rapidly controlling a system frequency.

In addition, according to a wireless power transfer system for optimal power transfer and a method of controlling an optimal resonance frequency using the system according to the invention, it is possible to improve stability and efficiency of wireless power transfer by minimizing an influence of a metal environment and to facilitate receiver circuit design since component selection is easy.

In addition, according to a wireless power transfer system for optimal power transfer and a method of controlling an optimal resonance frequency using the system according to the invention, there are provided a wireless power transfer system for efficient and optimal power transfer applicable to various systems or home appliances in an environment in which a transmission distance changes by rapidly and efficiently searching for a frequency control variable range and controlling a system frequency within the searched frequency variable range, and a method of controlling an optimal resonance frequency applied to the system.

BEST MODE

Figure 1:
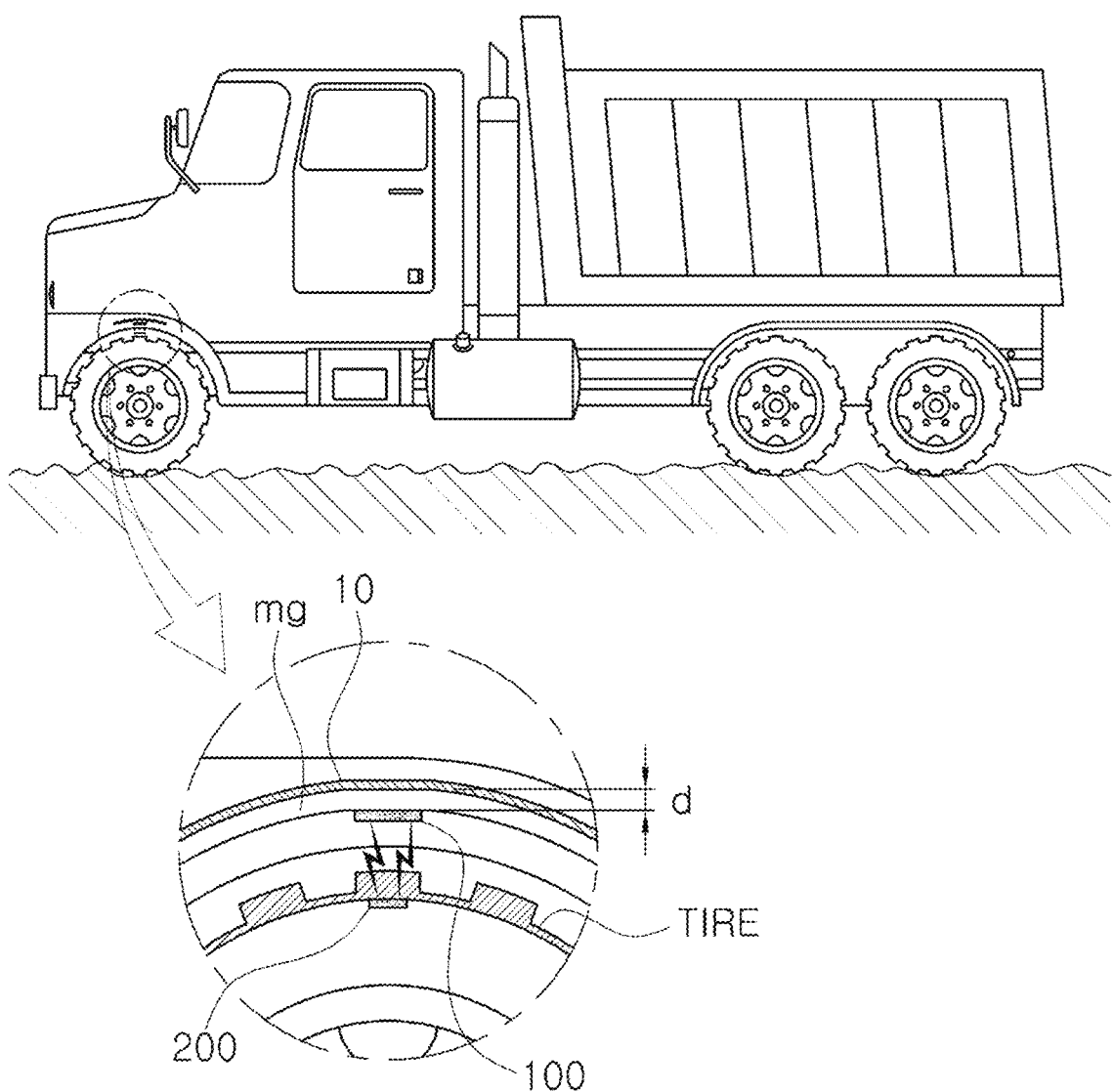
FIG. 1 is a schematic diagram of a block configuration of a wireless power transfer system using magnetic resonant coupling installed in a region where a metal object is provided according to an embodiment of the present invention.

Hereinafter, preferred embodiments of the present invention will be described in detail with reference to the attached drawings. However, the present invention is not limited to the embodiments described herein and may be embodied in other forms. Rather, the embodiments introduced herein are provided so that the disclosed content may be thorough and complete, and so that the spirit of the invention may be sufficiently conveyed to those skilled in the art. Like reference numerals represent like elements throughout the specification.

FIG. 1 illustrates an example of a wireless power transfer system using magnetic resonant coupling installed in a region where a metal object is provided according to an embodiment of the present invention.

The wireless power transfer system illustrated in FIG. 1 includes a transmitter on a wheel housing side of a vehicle and a receiver inside a tire to supply wireless power to a sensor module installed in the vehicle tire, so that power required by the sensor module (for example, an air pressure sensor) that may be installed inside the tire may be supplied.

The transmitter included in the wireless power transfer system may be mounted on an inner circumferential surface side of the wheel housing, and the receiver may be mounted on an inner circumferential surface of the tire, so that it is possible to apply a method in which the receiver passes a position facing the transmitter once during one rotation of the tire and wireless power is supplied at this moment.

The wheel housing is usually made of a metal material that extends from a side body of the vehicle, may form a mounting space for mounting the wheel and the tire, and may usually have a mud guide, etc., made of a non-metal material installed.

Since the transmitter included in the wireless power transfer system of the present invention needs to be installed in a direction of the tire, the transmitter may be mounted between a frame of the wheel housing and the mud guide or on the outside of the mud guide in the direction of the tire or a direction of an axle.

In addition, the receiver included in the wireless power transfer system of the present invention is mounted on the inner circumferential surface of the tire, etc., so that power may be wirelessly transmitted to supply power to the sensor module, etc.

In the wireless power transfer system, a metal object such as the frame of the wheel housing is provided therearound, and a distance between the transmitter and the receiver may continuously change depending on the tire specifications, road conditions, or suspension operation.

Therefore, a resonance frequency of the system continuously changes depending on the presence of the metal object present therearound, the distance between the transmitter and the receiver, etc. except for a direction in which power is transmitted to the receiver in the wireless power transfer system. However, in the case of a conventional wireless power transfer system, a fixed resonance frequency is used, and thus it is difficult to ensure stable wireless power transfer efficiency.

Accordingly, the wireless power transfer system of the present invention is a wireless power transfer system that supplies power to the sensor module, such as the air pressure sensor, installed inside the tire of the vehicle, and a technical challenge is to provide a wireless power transfer system in which a transmitter 100 is installed close to the wheel housing frame of the vehicle to automatically search for a resonance frequency that changes due to an influence of a metal object 10 forming the wheel housing frame of the vehicle and power may be efficiently transmitted to a receiver 200 by controlling the resonance frequency, so that, even when the resonance frequency of the transmitter changes to be different from the original due to the surrounding metal environment, power may be stably received due to a Q-value of pre-designed Rx described later.

That is, the present invention provides a wireless power transfer system capable of searching for an optimal resonance frequency for stable and optimal power transfer by automatically searching for a changed resonance frequency, efficiently setting a variable range of a control frequency, and setting a receiver resonance unit 210 to have a low Q (performance index) value in a special environment in which a resonance frequency changes due to an influence of the metal object 10 and the receiver 200 is required to have a small size to be mounted inside the tire in a wireless power transfer system for supplying power in a metal environment including the metal object 10 such as a wireless power transfer system of a sensor module mounted in the vehicle tire. A specific description will be given.

Figure 2:
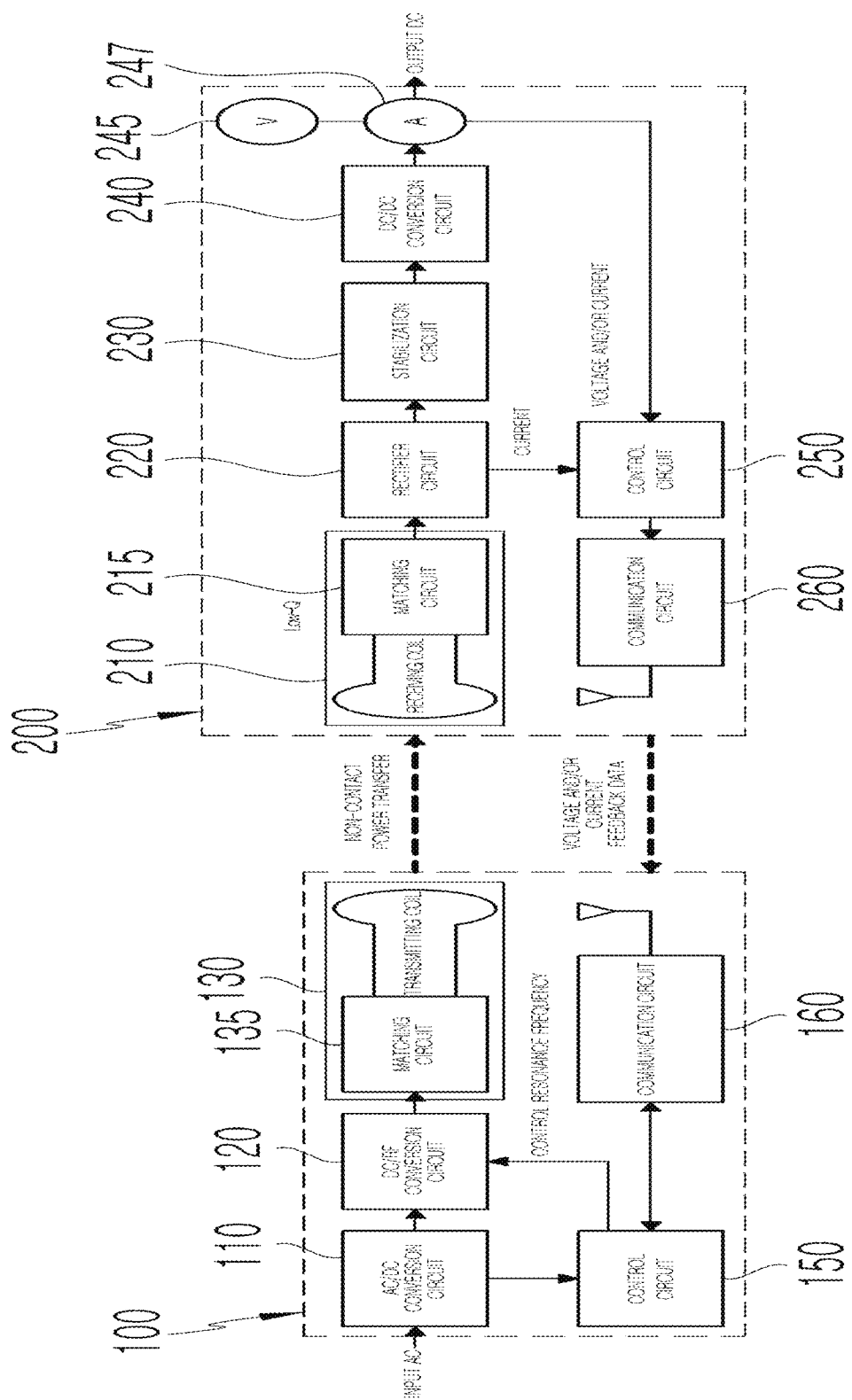
FIG. 2 is a schematic diagram of a detailed block configuration of a first system as the wireless power transfer system using magnetic resonant coupling installed in a region where a metal object is provided according to an embodiment of the present invention.

FIG. 2 is a schematic diagram of a detailed block configuration of a system (first system) that searches for optimal transmission efficiency using a preset reception voltage reference value or reception current reference value by controlling a system frequency as the wireless power transfer system using magnetic resonant coupling installed in a region where a metal object is provided according to an embodiment of the present invention.

The system according to the embodiment of the present invention illustrated in FIG. 2 may be a wireless power transfer system which is mounted on the wheel housing frame side made of a metal material of the vehicle mentioned above to automatically search for a resonance frequency changing in the metal environment through feedback of a reference voltage value or a reference current value measured by a voltmeter 245 and an ammeter 244 of the receiver, at this time, controls a frequency within a preset control frequency variable range based on the searched resonance frequency after designing the resonance unit 210 of the receiver 200 to have intentionally low Q so that a difference in power reception performance is not significant even when the resonance frequency varies within a full operating range of the transmitter resonance frequency, and searches for a frequency in the case where a received reception voltage value is greater than or equal to a preset reception voltage reference value as a resonance frequency having optimal transmission efficiency.

More specifically, as illustrated in FIG. 2, the system according to the embodiment of the present invention may include the transmitter 100 mounted on the wheel housing side and the receiver 200 provided in a tire sensor module mounted inside the tire to receive power transmitted from the transmitter 100 described above through a magnetic resonance effect.

The transmitter 100 may include an AC/DC conversion circuit 110 that converts AC input current into DC, a DC/RF conversion circuit 120 that converts DC converted by the DC conversion circuit into RF, a control circuit 150 that controls a resonance frequency when converting DC into RF power, a resonance unit 130 including a matching circuit 135 for magnetic resonant coupling and a transmitting coil connected to the matching circuit 135, and a communication circuit 160 that transmits and receives a voltage or current signal.

The receiver 200 may include a resonance unit 210 including a matching circuit 215 and a receiving coil causing coupling within a predetermined transmission distance with the transmitting coil and set to have a preset Q-value, a rectifier circuit 220 that rectifies a high-frequency reception power signal at a rear end of the resonance unit 210, a voltage stabilization circuit 230 that stabilizes an output voltage rectified at a rear end of the rectifier circuit 220, a DC/DC conversion circuit 240 that outputs a pre-intended voltage from a stabilized voltage at a rear end of the voltage stabilization circuit 230, a control circuit 250 that receives a current signal from the rectifier circuit 220 and a voltage and/or current signal measured at an output terminal of the DC/DC conversion circuit 240 and generates a feedback control signal, and a communication circuit 260 that transmits a feedback control signal to the communication circuit 160 of the transmitter 100.

As illustrated in FIG. 2, the system according to the embodiment of the present invention is a wireless power transfer system that sets a frequency at which a transmission current is maximum as a resonance frequency while transmitting power from the transmitter by varying a frequency within a preset range, sets the resonance unit 210 of the receiver 200 so that a Q-value has a preset value (Low Q), then measures an output voltage V at the output terminal of the DC/DC conversion circuit 240 of the receiver 200 using the voltmeter 245 while varying a system frequency within a preset frequency variable range based on a resonance frequency set through the control circuit of the transmitter 100, and determines a resonance frequency at which the measured output voltage is output as a preset determination voltage value as an optimal resonance frequency.

Figure 3:
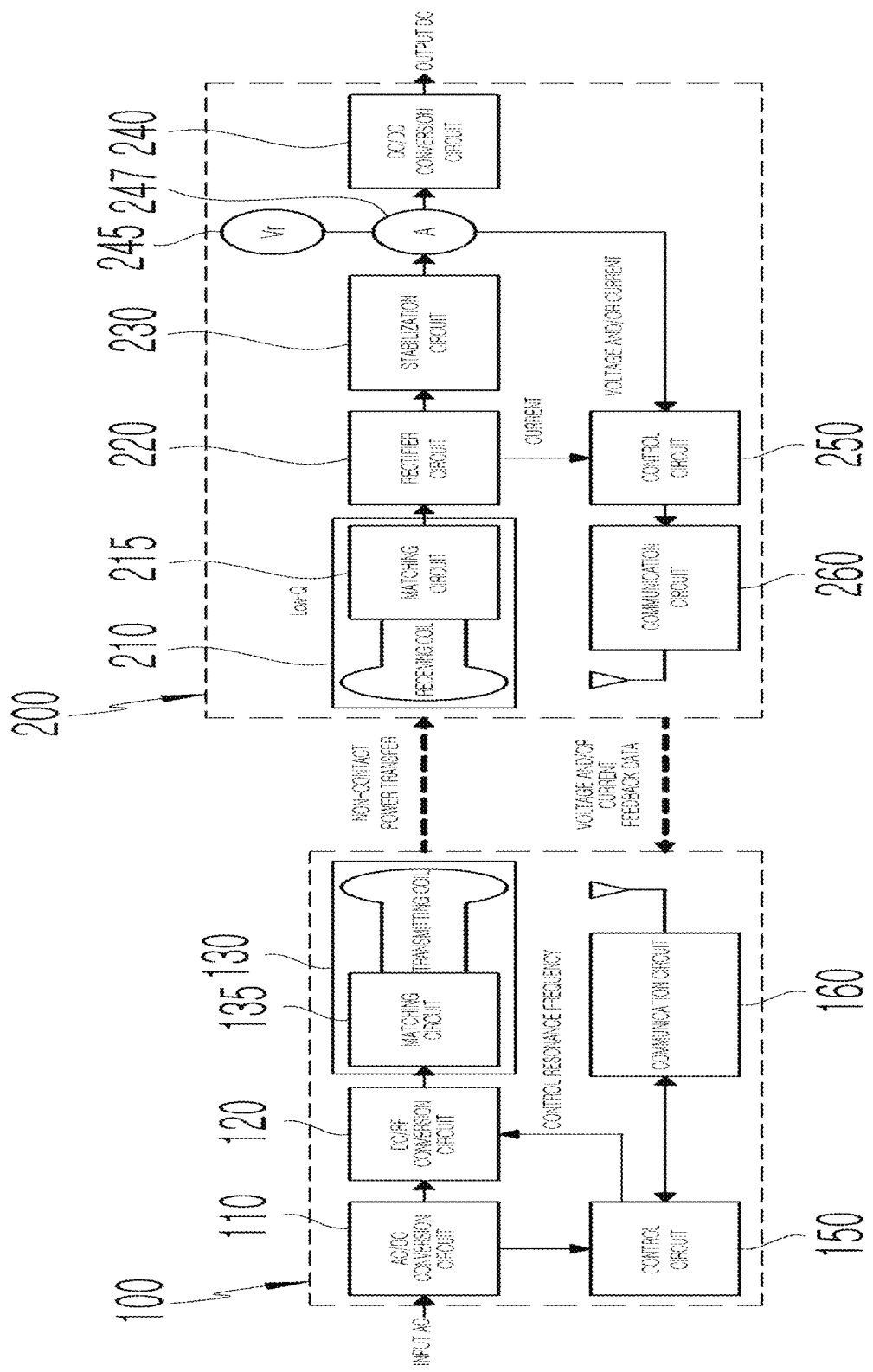
FIG. 3 is a schematic diagram of a detailed block configuration of a second system as the wireless power transfer system using magnetic resonant coupling installed in a region where a metal object is provided according to an embodiment of the present invention.

FIG. 3 is a schematic diagram of a detailed block configuration of a system (second system) that controls a system frequency and performs search by calculating power transfer efficiency as the wireless power transfer system using magnetic resonant coupling installed in a region where a metal object is provided according to an embodiment of the present invention.

As another embodiment of the present invention, it is possible to apply a wireless power transfer system that measures a stabilized output voltage (Vr) between the stabilization circuit 230 and the DC/DC conversion circuit 240 as a location where the output voltage is measured in the system unlike the embodiment illustrated in FIG. 2, and determines, as an optimal resonance frequency, a resonance frequency at which the measured stabilized output voltage (Vr) is greater than or equal to a preset reception voltage reference value.

That is, to ensure system stability and prevent a risk of damage to the device due to significant fluctuation in an output voltage value caused by load fluctuation of the output terminal, the stabilization circuit 230 may be provided between the rectifier circuit 220 and the DC/DC conversion circuit 240 of the receiver 200 to increase output stability. In this way, it is possible to provide a wireless power transfer system having more stable optimal transmission efficiency by using the stabilized output voltage value (Vr) measured between the stabilization circuit 230 and the DC/DC conversion circuit 240 as the output voltage value.

In addition, the reception voltage reference value for the measured stabilized output voltage value (Vr) may be greater than the reception voltage reference value for a DC output voltage value (V) measured at the output terminal. A reason therefor is that there is a characteristic in that the stabilized output voltage increases in proportion to the amount of received power.

Further, the second system according to the embodiment of the present invention illustrated in FIG. 3 may be a wireless power transfer system that is installed on the wheel housing frame side of the vehicle to automatically search for a resonance frequency changing in a metal environment through measurement of a transmission current of the transmitter 100, sets the resonance unit 210 of the receiver 200 to have a preset low Q-value (Low Q), then calculates power transfer efficiency through an input current value, an output voltage value (Vr), and an output current value (A) among frequencies when a received reception voltage value is greater than or equal to a preset reception voltage reference value while controlling a frequency within a preset control frequency range based on the searched resonance frequency, and searches for a resonance frequency corresponding to a maximum value as a frequency having optimal transmission efficiency.

Here, the resonance unit 210 of the receiver 200 may be an LC resonance unit including a receiving coil and a matching circuit, and is designed to have an intentionally low Q so that a difference in power reception performance is not significant even when the resonance frequency fluctuates within the entire operating range of the transmitter resonance frequency.

More specifically, the second system according to the embodiment of the present invention may measure an input current value of the transmitter 100 and an output voltage (V) value at the output terminal of the DC/DC conversion circuit 240 of the receiver 200 while varying the system frequency within a preset frequency variable range through the control circuit 150 of the transmitter 100, and may calculate power transfer efficiency through an input current value, an output voltage value, and an output current value at the corresponding system frequency and determine a resonance frequency corresponding to a maximum value as the optimal resonance frequency when a measured output voltage value is greater than or equal to a preset reception voltage reference value.

In addition, as another embodiment of the present invention, the system may be a wireless power transfer system that may measure an input current value of the transmitter 100 and a stabilized output voltage value (Vr) between and the stabilization circuit 230 and the DC/DC conversion circuit 240 of the receiver 200 while varying a system frequency within a preset frequency variable range through the control circuit 150 of the transmitter 100, and may calculate power transfer efficiency through an input current value, an output current value (A), and a stabilized output voltage value (Vr) at the corresponding system frequency and determine a resonance frequency corresponding to a maximum value as the optimal resonance frequency when the measured stabilized output voltage value (Vr) is greater than or equal to a preset reception voltage reference value.

Figure 4:
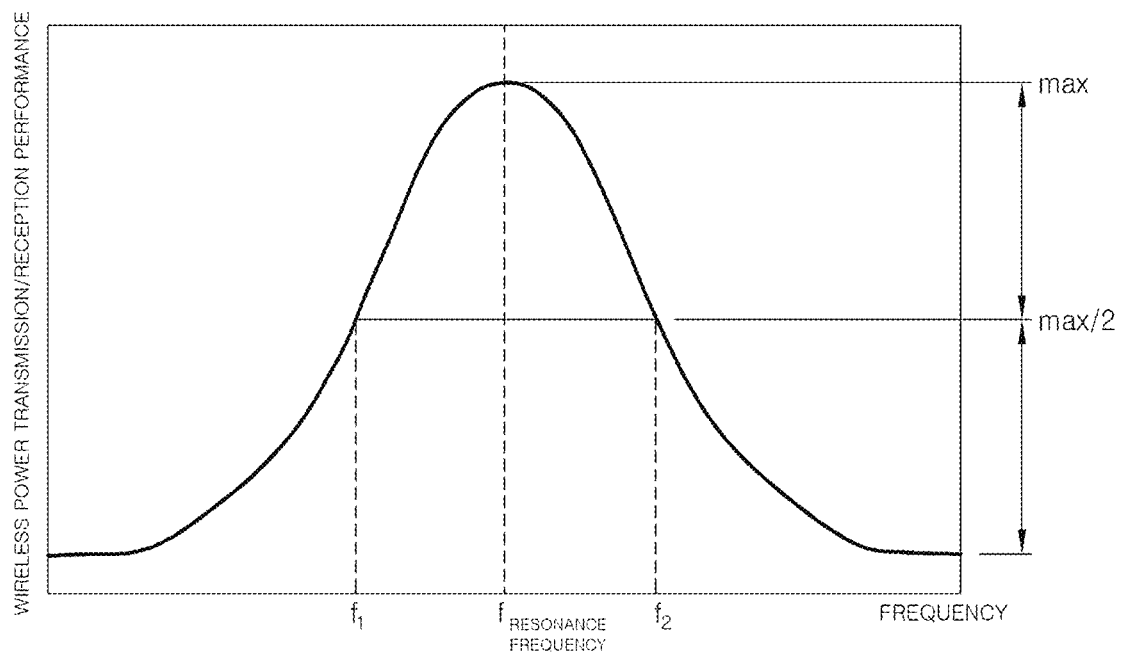
FIG. 4 is a graph defining and describing a quality factor (Q) applied to the wireless power transfer system according to an embodiment of the present invention.
Figure 5:
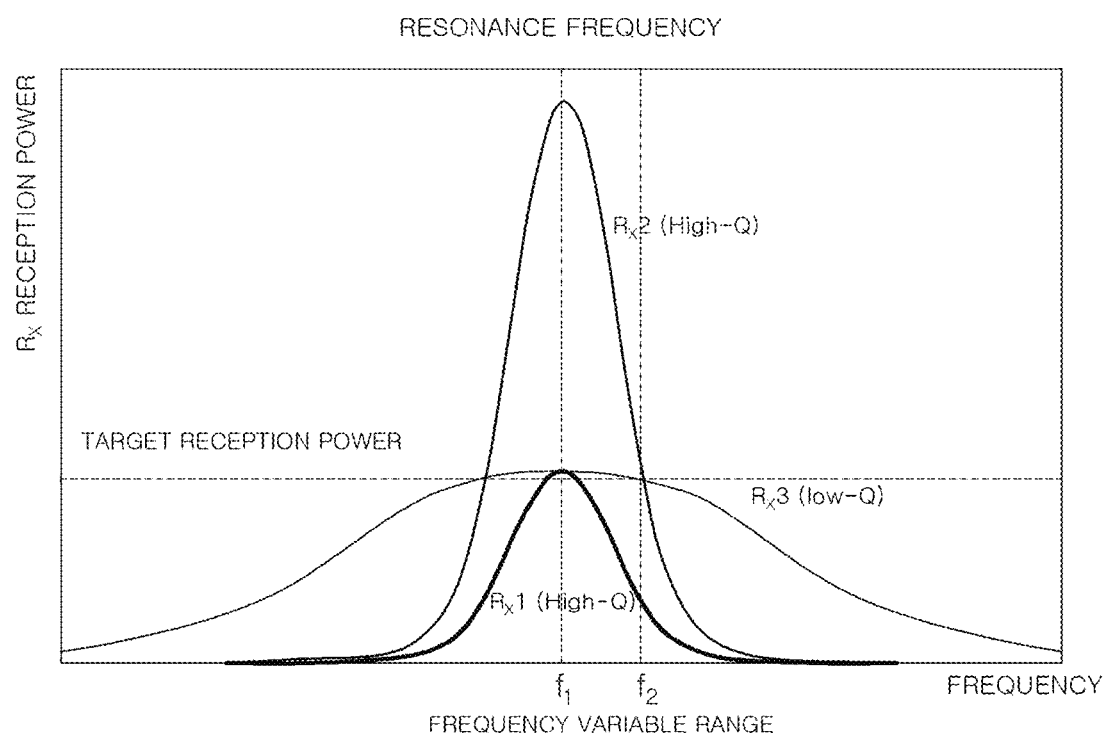
FIG. 5 is a graph describing a design method of a receiver (Rx) achieving target reception power in the wireless power transfer system according to an embodiment of the present invention.

FIG. 4 is a graph defining and describing a quality factor (Q) applied to the wireless power transfer system according to an embodiment of the present invention, and FIG. 5 is a graph describing a design method of the receiver 200 achieving target reception power in the wireless power transfer system according to an embodiment of the present invention.

In the embodiment of the present invention, to solve a problem that the resonance frequency frequently changes due to the influence of the metal object 10, such as a vehicle frame, located at a rear end of the transmitter 100 in a wireless power transfer system applied to a tire sensor of the vehicle, and thus power cannot be stably received from the receiver 200, the resonance unit 210 of the receiver 200 needs to be designed so that a Q-value of the resonance unit 210 of the receiver 200 has a preset low value (Low Q) to stably receive power in a wide range, and definition of the Q-value is illustrated in FIG. 4.

That is, the Q-value may be defined as a full width at half maximum (FWHM), and is defined as a value obtained by dividing a resonance frequency by a frequency ($f_2$, $f_1$) width at half a maximum power transmission/reception performance value shown at the resonance frequency. The value is as shown in the following [Mathematical Formula 1].

$$Q = \frac{f_{resonance\ frequency}}{f_2 - f_1} \quad \text{[Mathematical Formula 1]}$$

For example, when the resonance frequency is 200 kHz, $f_1$=199 kHz, and $f_2$=201 kHz, Q=200 kHz/(201 kHz–199 kHz)=100.

A design method of the receiver 200 achieving target reception power of the wireless power transfer system according to the embodiment of the present invention using Q defined in this way is described in detail with reference to FIG. 5 as follows.

When a transmission distance between the transmitter 100 and the receiver 200 is fixed and the resonance frequency does not change to $f_1$, design of the receiver 200 is efficiently optimal when impedance is designed to receive target reception power at a maximum value at the resonance frequency $f_1$, such as $Rx_1$ (High Q). Therefore, the Rx circuit never receives excessive power, so that the circuit may be stably used. However, as a disadvantage, when the resonance frequency changes to $f_2$ differently from the design intention, a problem may occur in which reception power falls short of the target.

In the case of designing $Rx_2$ illustrated in FIG. 5 considering a condition that the resonance frequency changes, there is no problem in receiving the target reception power even when the frequency varies in the range of $f_1$ to $f_2$. However, excessive power may be received at the resonance frequency (f1), which may cause circuit heat generation or cause the circuit components to be destroyed by exceeding a limit of a withstand voltage of a circuit component due to a voltage increase. In addition, there is a problem that expensive high-voltage and high-heat withstanding components need to be used in order to design a reliable circuit.

Therefore, an embodiment of the present invention proposes a method and system for searching for a resonance frequency variable range and designing Rx to low Q using an $Rx_3$ method illustrated in FIG. 5 to be suitable thereto in a situation where the resonance frequency changes, such as in a metal environment where the metal object 10 such as the tire sensor of the vehicle is installed. When the resonance unit 210 of the receiver 200 is designed in this way, even if the frequency changes within the range of $f_1$ to $f_2$, a difference in the received power is not significant, and thus there is almost no heat generation and the circuit is not destroyed. Therefore, selection of components is easy, making the circuit design of the receiver 200 easier, and there is a great advantage of high circuit stability.

Further, in the tire industry, a weight limit of an inner tire sensor module is reported to be 15 to 20 g for passenger cars and 25 g for trucks. From a tire dynamics perspective, the weight limit of the sensor module is set since local load within the tire may cause tire vibration.

When designing an Rx (receiver) module to satisfy such conditions, a size of a wireless power coil needs to be minimized, and design is limited to a diameter of approximately 85 mm or less. In addition, even when a control resonance frequency of the transmitter varies within a relatively wide frequency control range, a deviation in reception performance according thereto should not be significant, and thus the Q-value of the resonance unit 210 including the receiving coil is preferably limited to less than 100.

In addition, it is possible to set the Q-value of the receiver resonance unit 210 to less than 100, and to set the Q-value of the transmitter resonance unit 130 to 100 or more. Such setting may be applied to a system having the transmission resonance unit 130 and the reception resonance unit 210 for a long-distance smart tire having a relatively long transmission distance.

Further, in the case of a wireless power transfer system including a short-range general home appliance resonance unit having a relatively short transmission distance, the Q-value of each of the resonance units 130 and 210 of the transmitter 100 and receiver 200 may be set to less than 100. The Q-value applied to the resonance unit of the above-described system is a Q-value of a resonance unit including a transmitting or receiving coil and a capacitor of each matching circuit.

Figure 6:
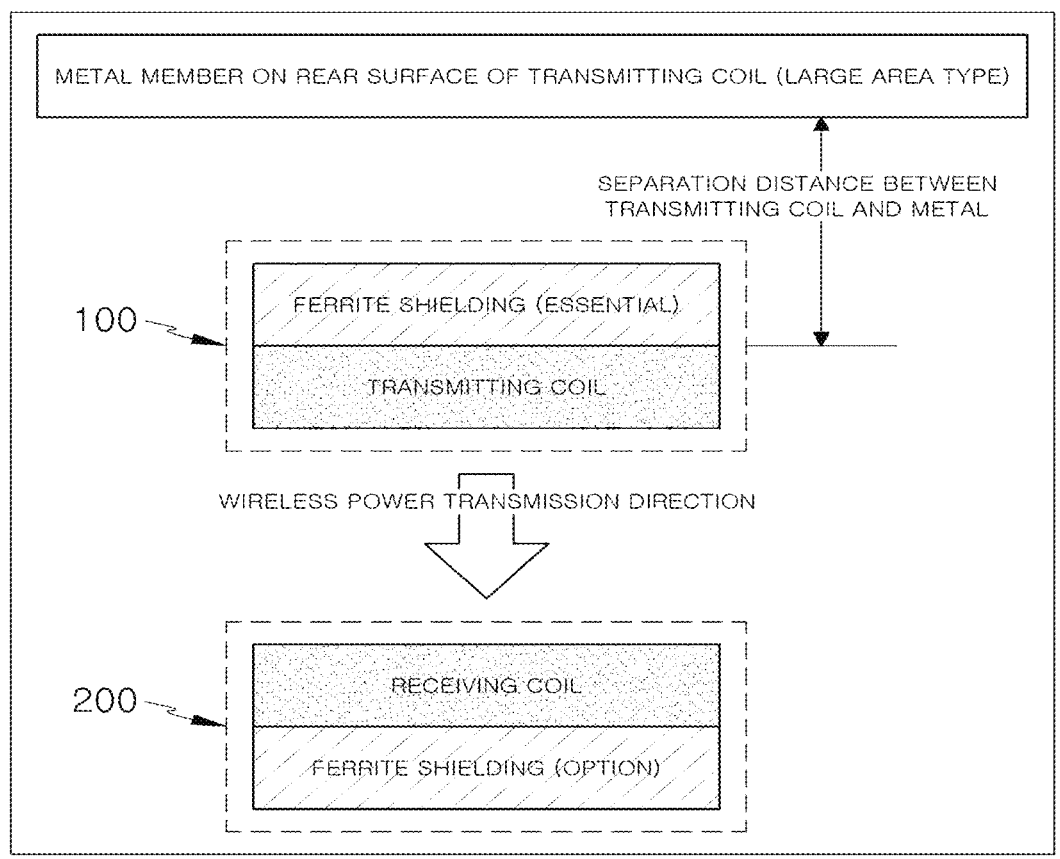
FIG. 6 (a), (b) & (c) are a schematic diagram and graphs illustrating a change in inductance of a coil in a metal environment of the wireless power transfer system using magnetic resonant coupling installed in a region where a metal object is provided according to another embodiment of the present invention.
Figure 6:
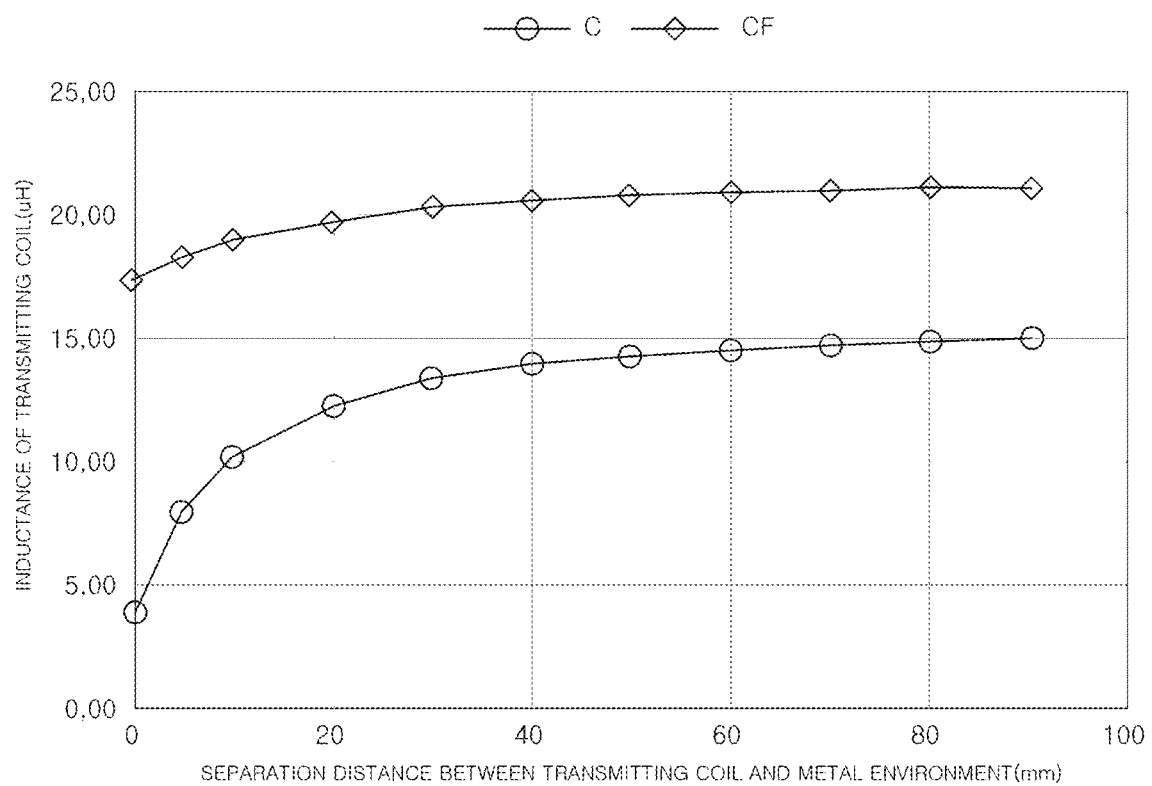
Figure 6:
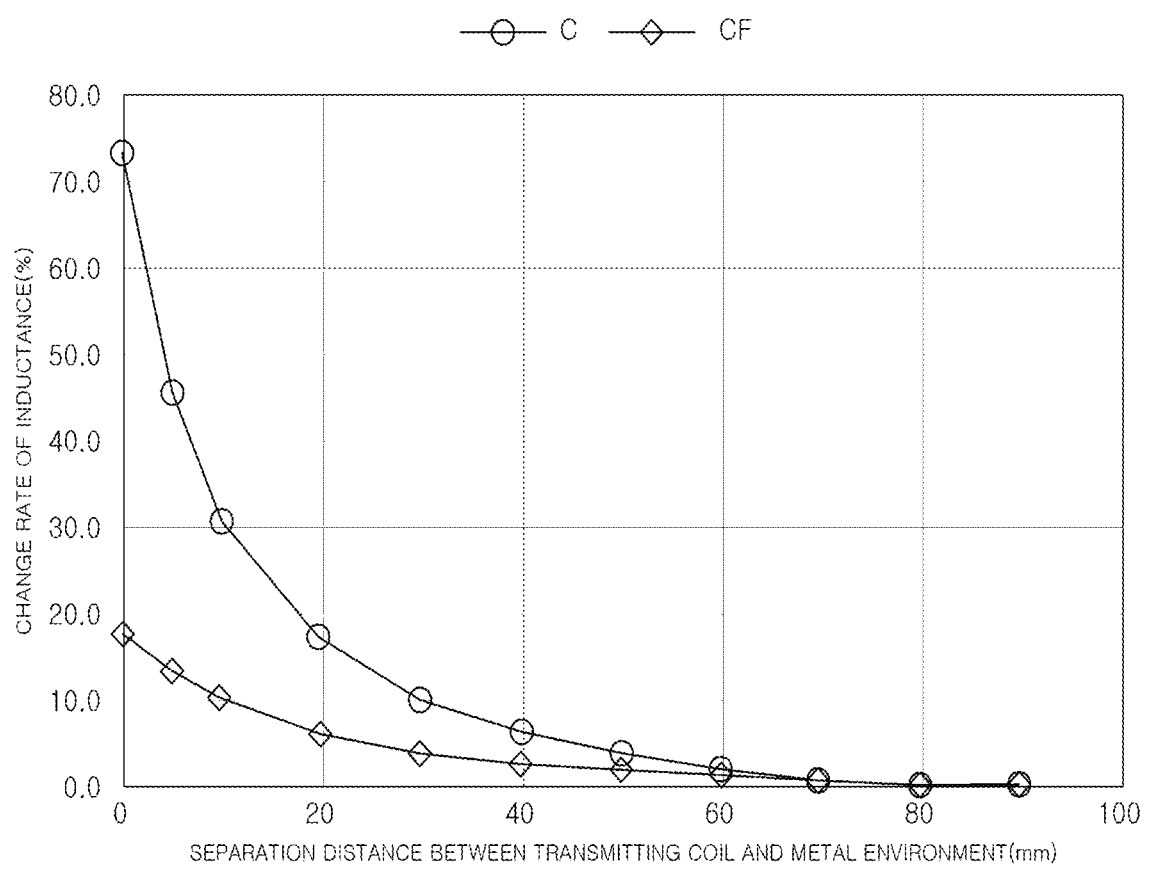

FIG. 6 is a schematic diagram and graphs illustrating a change in inductance of a coil in a metal environment of the wireless power transfer system using magnetic resonant coupling installed in a region where a metal object is provided according to another embodiment of the present invention. As the inductance of the coil changes, the physical resonance frequency of the resonance unit changes.

FIG. 6A is a schematic diagram illustrating a separation distance from the metal object 10 of the wireless power transfer system in a metal environment, FIG. 6B is a graph illustrating inductance of the transmitting coil according to a separation distance between the metal object 10 and the transmitting coil, and FIG. 6C is a graph illustrating a rate of change in inductance according to the separation distance between the metal object 10 and the transmitting coil.

As illustrated in FIG. 6A, the wireless power transfer system using magnetic resonant coupling installed in the region where the metal object 10 according to the embodiment of the present invention is provided proposes a structure in which an electromagnetic shielding member made of ferrite is attached to the rear end of the transmitter 100, unlike the embodiment of FIG. 1, so that an influence of the metal environment may be minimized by attaching the electromagnetic shielding member made of ferrite between the transmitter 100 (transmitting coil) and the metal object 10 in order to reduce or eliminate an effect of electromagnetic waves generated from the transmitting coil being reflected by the metal object 10 such as the vehicle frame at the rear end of the transmitter 100, thereby causing a change in the inductance of the transmitting coil of the transmitter 100.

Here, ferrite is an industrially important material as a high-frequency magnetic material having ferromagnetic properties that exhibits spontaneous magnetization at room temperature and used for relatively large electrical resistance. In addition, ferrite is generally an ionic compound with a spinel structure, and may be formed by combining with various metal compounds having iron oxide as a main component. Ferrite having such a spinel structure is widely used as an electromagnetic wave absorbing material and an electromagnetic wave shielding material.

In an embodiment of the present invention, in order to minimize the influence of the metal environment such as the metal object 10 located at the rear end of the transmitting coil, as illustrated in FIG. 6, the electromagnetic shielding member made of ferrite is attached to the rear end of the transmitter 100 located between the transmitter 100 and the metal object 10, thereby being able to minimize the influence of the metal environment such as the vehicle frame. In the case of the transmitter, system design may be facilitated when a variable range of a system (=physical) resonance frequency of the transmitter due to the metal environment is minimized by minimizing a change coil inductance through ferrite shielding, so that the variable range of the resonance frequency of the transmitter is limited as much as possible to be maintained within a frequency range where a change in reception performance is small in the receiver.

Further, it is possible to strengthen electromagnetic shielding by installing a ferrite shielding material at a rear end of the receiving coil installed inside the tire.

To examine an influence of inductance of the transmitting coil of the wireless power transfer system in such a metal environment, the inductance and an inductance change rate of the transmitting coil according to a distance between the transmitting coil and the metal object 10 were measured through an experiment, and results are illustrated in FIGS. 6B and 6C. In the graphs, C is a graph for the transmitting coil not including a shielding member, and CF is a graph for the transmitting coil having the electromagnetic shielding member made of ferrite attached thereto.

First, it can be seen that the inductance and the change rate of the transmitting coil significantly change when the distance between the metal object 10 and the transmitting coil is within about 40 mm, and the inductance significantly decreases as the transmitting coil approaches the metal object 10. In this regard, it can be seen that there is a problem that the inductance decreases and the change increases due to the influence of the metal object 10, thereby lowering efficiency and stability of power transfer. Further, it can be clearly seen from FIGS. 6B and 6C that the inductance and the change rate thereof of the transmitting coil does not relatively significantly change even if the distance from the metal object 10 changes when the ferrite shielding material is attached to the rear end of the transmitting coil.

In this way, in the wireless power transfer system using magnetic resonant coupling installed in the region where the metal object 10 is installed according to the embodiment of the present invention, a wireless power system stably operating even in the metal environment may be designed when the electromagnetic shielding member such as ferrite is provided in the transmitter 100 to minimize a frequency variable range due to the metal environment as much as possible. When the frequency variable range of the transmitter excessively increases without being limited, even if the receiver is designed to have a low Q-value, since a frequency range within which wireless power is smoothly received is restricted even though the frequency range is wider than that of a coil having a high Q-value, power reception is unfavorable outside this range. In addition, when the receiver is designed to have an excessively low Q-value, there is a problem that wireless power reception performance is unfavorable. Therefore, the Q-value of the receiver should not be excessively low and should be within a range of a minimum of 30 to a maximum of 90. On the other hand, when the Q-value of the receiver is excessively large, over 100, reception efficiency at the resonance frequency is excellent. However, there is a problem that reception performance drastically differs even when the frequency slightly changes due to the metal environment.

Figure 7:
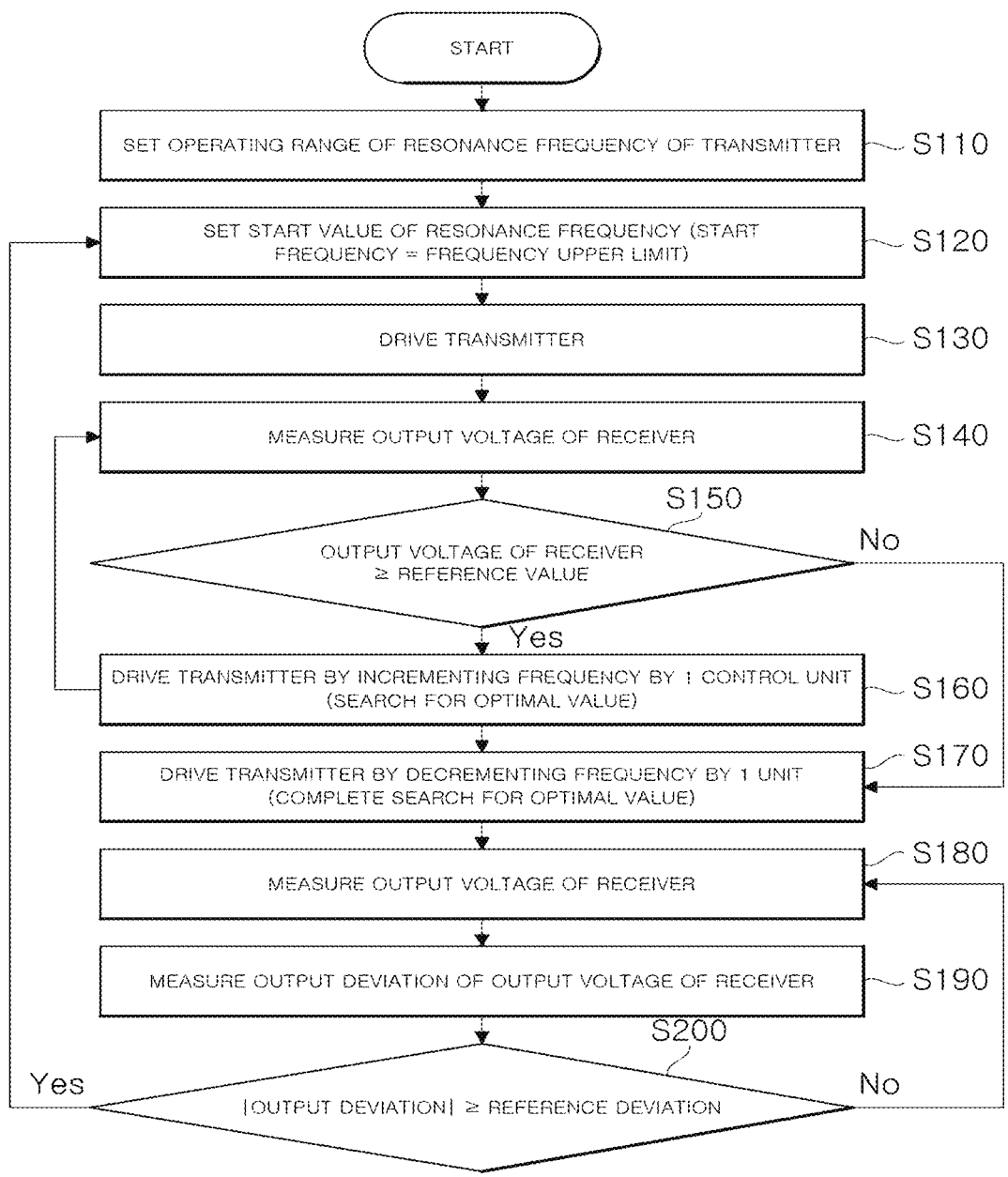
FIGS. 7 and 8 illustrate detailed flowcharts of a method of controlling an optimal resonance frequency of the wireless power transfer system for optimal power transfer according to an embodiment of the present invention.
Figure 8:
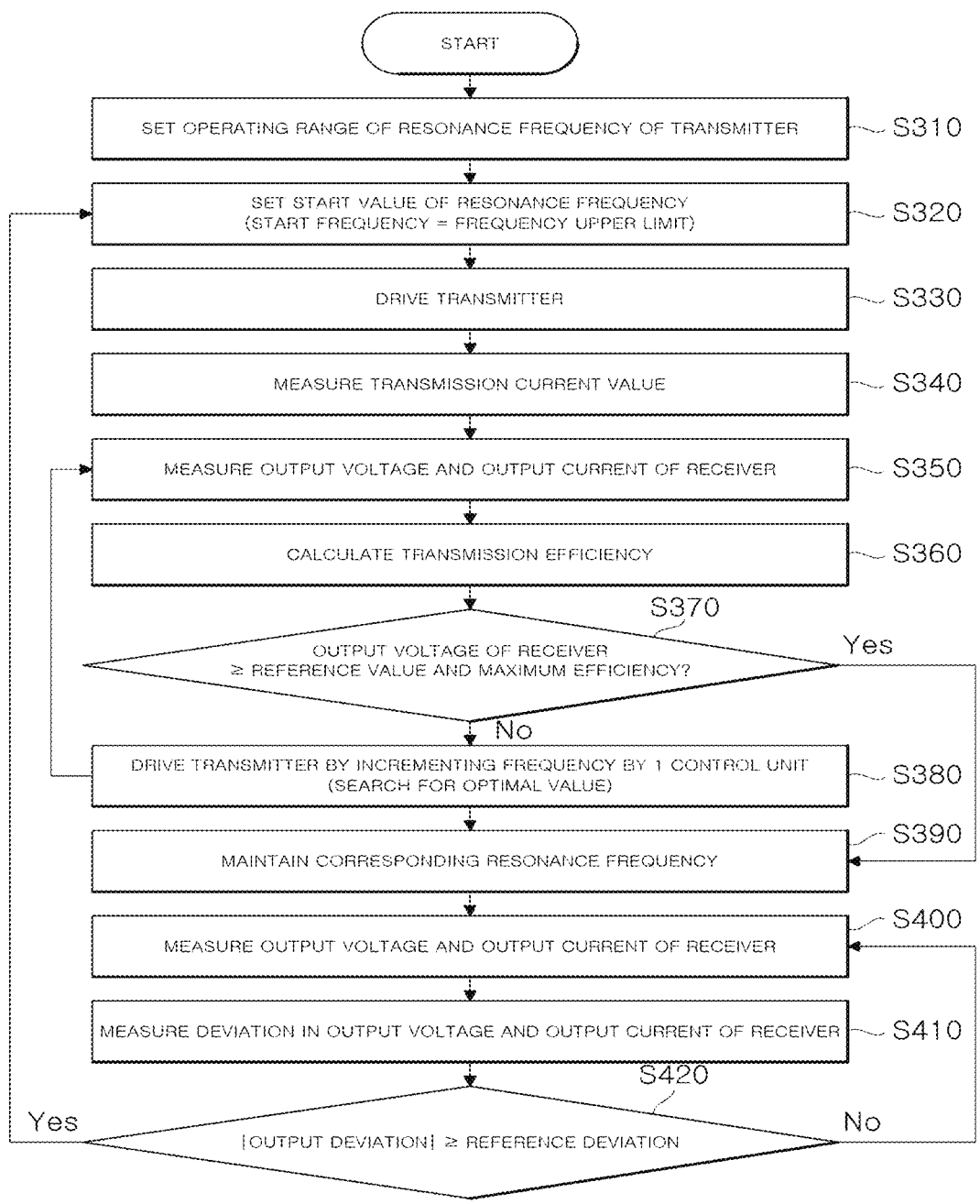

FIGS. 7 and 8 illustrate detailed flowcharts of a method of controlling an optimal resonance frequency of the wireless power transfer system for optimal power transfer according to an embodiment of the present invention.

Before implementing the method of controlling the resonance frequency of FIGS. 7 and 8, first, an operating range of a system resonance frequency variation value of the transmitter due to the surrounding metal environment excluding a direction of wireless power transfer is calculated, and a resonance circuit of the receiver is designed to have a low Q-value that allows an output voltage of the receiver to be greater than or equal to a reference value in this frequency range.

As illustrated in FIG. 7, the method of controlling the optimal resonance frequency of the wireless power transfer system for optimal power transfer according to an embodiment of the present invention proposes a method of searching for, maintaining, and controlling an optimal resonance frequency that allows the receiver to stably output a voltage greater than or equal to a reference value in a method of controlling a frequency for optimal power transfer of the wireless power transfer system using wireless power transfer system of the transmitter 100 and the receiver 200 installed in a region where the metal object 10 is provided.

A control range is determined to be a frequency range suitable for characteristics designed in advance in resonance circuits of the transmitter and the receiver. As illustrated in FIG. 5, within a control frequency range, a lowest frequency is defined as a lower limit, and a highest frequency is defined as an upper limit. In FIG. 5, when a range from f1 to f2 is defined as a control range, f1 is a frequency lower limit, and f2 is a frequency upper limit.

The upper limit and the lower limit of the frequency are defined prior to implementing a control algorithm by first identifying an influence of a frequency variation range for metal around the transmitter. FIGS. 7 and 8 both illustrate examples of frequency upward search control. Upward control is a method of searching for an optimal resonance frequency while incrementing a frequency by 1 control unit starting from the frequency lower limit. In FIG. 7, the optimal frequency is the last frequency at which the output voltage of the receiver exceeds a criterion value.

Specifically, the method of controlling a frequency for optimal power transfer of the wireless power transfer system illustrated in FIG. 7 may first calculate an operating range of a system resonance frequency variation value of the transmitter due to the surrounding metal environment excluding the wireless power transfer direction (S110), and set a resonance frequency start value (s120). As described above, in the case of downward control, a start frequency may be a frequency upper limit of the operating range of the resonance frequency variation value. However, in the case of searching by upward control as illustrated in FIG. 7, the start frequency may be a frequency lower limit.

Therefore, it is possible to sequentially drive the transmitter according to a frequency (S130), measure an output voltage of the receiver (S140), compare an output voltage of the receiver with a reference value (S150), and sequentially drive the transmitter by incrementing the frequency by 1 control unit through upward control when the output voltage of the receiver is still high (S160).

When the output voltage of the receiver decreases as a result of comparison between the output voltage of the receiver and the reference value (S150), a resonance frequency at a point immediately therebefore is determined to be the optimal resonance frequency, and search for the optimal resonance frequency is complete. Therefore, the frequency is decremented by 1 unit in reverse, the transmitter is driven at the previous resonance frequency (S170), the output voltage of the receiver is measured (S180), a deviation of the output voltage of the receiver is measured (S190), and the deviation is compared with a reference deviation (S200). When the reference deviation is greater than the output deviation, steps from the step of setting the start value of the resonance frequency are repeated again. When the output deviation is less than the reference deviation, the step of searching for the resonance frequency is ended, and the process may return to a state of receiving the output voltage of the receiver while transmitting wireless power to the optimal resonance frequency (S180).

FIG. 8 is a method of searching for, as an optimal frequency, a frequency that satisfies both transmission efficiency and an output voltage by further measuring a transmitter current and a receiver current.

Points different from the method illustrated in FIG. 7 will be mainly described. A method of controlling the optimal resonance frequency of the wireless power transfer system for optimal power transfer illustrated in FIG. 8 includes a step of measuring a transmission current during a control step and a step of calculating transmission efficiency.

Specifically, a transmission current value is measured (S340) after a step of sequentially driving the transmitter according to a frequency (S330) at a start value resonance frequency set in a step of setting a resonance frequency start value (S320), a receiver current is measured in addition to a receiver output voltage (S350), and whether transmission efficiency is maximum may be determined in addition to a voltage reference value in a step of comparing the receiver output voltage with a reference value (S370). That is, in FIG. 8, the optimal resonance frequency is a frequency at which the output voltage of the receiver exceeds the reference value and transmission efficiency is locally maximum.

When the receiver output voltage is less than the reference value or transmission efficiency is not maximum, the step of setting the resonance frequency start value and subsequent steps are repeated to perform upward search. When the receiver output voltage is greater than the reference value and power transfer efficiency is maximum, a state of driving the transmitter at the corresponding resonance frequency is maintained (S390), the receiver output voltage and current are received (S400), and a deviation between the output voltage and the output current of the receiver is measured (S410).

Similarly, an output deviation between the output voltage and the current of the receiver is measured (S410) and compared with a reference deviation (S420). When the output deviation is greater than the reference deviation, the step of setting the resonance frequency start value (S320) is repeated. When the output deviation is less than the reference deviation, the resonance frequency search step is completed, wireless power is transmitted at the optimal resonance frequency, and it is possible to return to a state of receiving the output voltage and the output current of the receiver (S400).

Similarly, the control method illustrated in FIG. 8 allows for downward search control. This case is a method of searching for the optimal resonance frequency while decrementing the frequency by 1 control unit starting from the lower limit of the frequency range as the start frequency.

Figure 9:
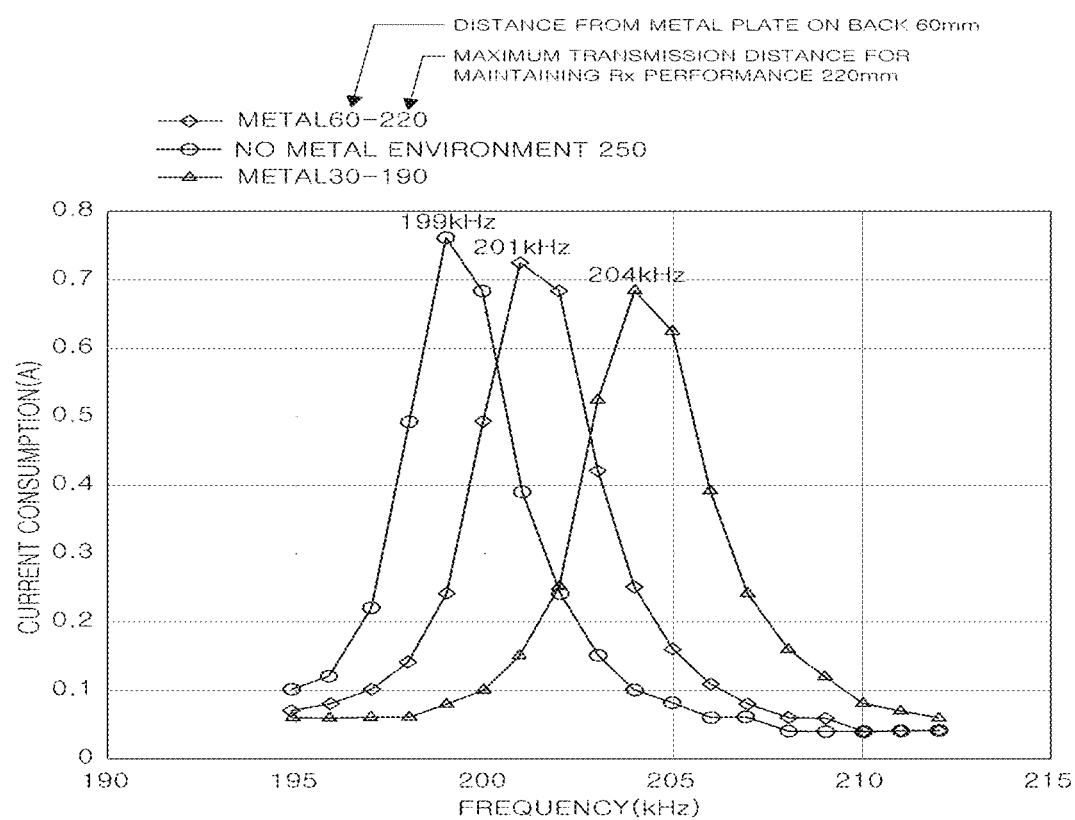
FIG. 9 is a graph illustrating a change in resonance frequency of a transmitting coil in a metal environment applied to an optimal resonance frequency method according to an embodiment of the present invention.

FIG. 9 illustrates a method of designing a range of operating control frequencies expected to vary, or in other words, upper and lower limits of frequency control, in consideration of an installation situation of the transmitting coil in a metal environment according to an embodiment of the present invention. In general, as the physical frequency of the wireless power system increases, the size or quantity of components decreases, and thus it is easier to configure the resonance circuit. Therefore, it is advantageous to select a maximum value in a legally determined allowable frequency band as the upper limit of the control frequency. In this embodiment, since the wireless power allowable frequency band is 110 to 205 kHz, the upper limit of the frequency control range is determined to be 205 kHz, and design of the lower limit of the frequency control is performed. A target of application is the transmitter for wirelessly supplying power to the tire sensor, which is installed in the wheel housing, and the metal frame of the vehicle is located within 30 to 60 mm of the rear of the wheel housing, depending on the installation location. Therefore, it is an environment in which the resonance frequency is expected to change due to the metal frame of the vehicle when the transmitter is installed.

As illustrated in FIG. 9, when the transmitter 100 designed to have a resonance frequency of 199 kHz without considering the metal environment is placed in a metal environment, the system resonance frequency may be found by monitoring current of the transmitter 100 according to a distance from the metal object 10. That is, when current consumption of the transmitter according to a change in the control frequency is measured and displayed in a graph in an installation environment without a metal object and when distances to the metal object 10 and the transmitter 100 are 60 mm and 30 mm, respectively, it can be clearly seen that the frequency corresponding to the maximum transmission current consumption is the resonance frequency. In this regard, as described above, by monitoring the transmission current, the frequency indicating the maximum transmission current may be rapidly and effectively identified as the resonance frequency. Here, a front of the transmitting coil is defined as a wireless power transfer direction. The metal frame is located on the back.

The physical resonance frequency of the transmitter, which was initially designed regardless of the metal environment, was 199 kHz. However, results of this experiment show that the resonance frequency is expected to be located between a minimum of 201 kHz and a maximum of 204 kHz when installed in a mud guard. Therefore, the control frequency range needs to include these two frequency ranges to enable stable and efficient control. In addition, considering a usage band in the absence of a metal environment, the lower limit of the frequency control is set to 199 kHz.

Frequency control is a consistent functional relationship that uses either a left or right band based on the system resonance frequency. In general, the right band of the resonance frequency is used. When the lower limit of the frequency range is set to 199 kHz and the upper limit thereof is set to 205 kHz, this range is a range allowing transmission of wireless power in both a situation where there is no metal environment and a situation where the metal environment is within a range of 30 to 60 mm, and thus is available.

In this way, considering frequency variation due to the metal environment, the transmitter is designed to have an intended frequency range for the fluctuation range of the physical resonance frequency of the transmitter. However, it can be seen that the resonance frequency is 204 kHz when the surrounding metal is close and 30 mm away.

In this case, the actual frequency control range is merely about 1 kHz, from 204 kHz to 205 kHz. Therefore, in order to further increase this frequency range, the design of the transmitter needs to be modified. For example, in this situation, in order to have a control range of at least 3 kHz, the design needs to be changed so that the resonance frequency of the transmitter becomes 202 kHz when the surrounding metal is close and 30 mm away.

In this case, the resonance frequency also changes when there is no surrounding metal and when the surrounding metal is close and 60 mm away. Accordingly, the lower control limit is changed accordingly to determine the frequency operation range.

After designing the transmitter in this way, the Q-value of the receiver needs to be designed so that there is no difference in reception performance over the frequency operation range. As illustrated in FIG. 5, when the frequency control lower limit is f1 and the frequency control upper limit is f2, the Q-value of the receiver is determined so that a deviation in reception performance between the frequency f1 and the frequency f2 is not excessively large.

When the Q-value is excessively low, reception performance deteriorates, and when the Q-value is excessively high, a reception power deviation according to the frequency becomes excessively large, so that the circuit needs to operate over a wide power range, and thus component selection becomes difficult and a component price becomes high. Therefore, the Q-value needs to be appropriately selected to optimize performance and price.

When the Q-value is lower than 30, reception performance is significantly poor. When the Q-value is greater than 100, the value is excessively large, and thus the reception performance deviation becomes large in response to a slight change in frequency. Therefore, the Q-value is determined by defining a difference between maximum reception performance and minimum reception performance in this range. For example, when the difference between the maximum reception performance and the minimum reception performance in the frequency control range is designed to be 25% or less, intended power reception performance in the system may be obtained by determining the Q-value to be approximately 50.

The invention claimed is:

1. A wireless power transfer system for optimal power transfer using magnetic resonant coupling in which a metal object is provided near a transmitter, the wireless power transfer system comprising:
   the transmitter configured to transmit power by including an AC/DC conversion circuit, a DC/RF conversion circuit, a matching circuit, a transmitting coil, a control circuit, and a communication circuit; and
   a receiver configured to receive power by including a receiving coil, a matching circuit, a rectifier circuit, a stabilization circuit, a DC/DC conversion circuit, a control circuit, and a communication circuit, wherein:
   the system is configured to control reception power of the receiver by controlling a frequency of transmission power from the transmitter, and
   a resonance unit of the receiver including the receiving coil and the matching circuit of the receiver is designed so that a Q (quality factor)-value of the resonance unit defined by Mathematical Formula 1 is less than a preset value:

$$Q = \frac{f_{resonance\ frequency}}{f_2 - f_1} \quad \text{[Mathematical Formula 1]}$$

where the Q-value is a full width at half maximum (FWHM), and is defined as a value obtained by dividing a resonance frequency by a frequency (f2, f1) width at half a maximum power transmission/reception performance value shown at the resonance frequency.

2. The wireless power transfer system according to claim 1, wherein:
   the transmitter is mounted below a wheel housing of a vehicle, and the receiver is mounted inside a tire of the vehicle mounted on a side of the wheel housing to supply power to a sensor module mounted inside the tire, and
   the metal object is disposed in a region excluding a wireless power transfer space of the transmitter with respect to the receiver.

3. The wireless power transfer system according to claim 2, wherein the sensor module is an acceleration sensor, a temperature sensor, or an air pressure sensor.

4. The wireless power transfer system according to claim 1, wherein the Q-value of the resonance unit of the receiver is set to less than 100, and a Q-value of a resonance unit including the transmitting coil and the matching circuit of the transmitter is set to 100 or more.

5. The wireless power transfer system according to claim 1, wherein both the Q-value of the resonance unit of the receiver and a Q-value of a resonance unit including the transmitting coil and the matching circuit of the transmitter are set to less than 100.

6. The wireless power transfer system according to claim 1, wherein a shielding member made of ferrite is attached between the metal object and the transmitter.

7. A method of controlling a frequency for optimal power transfer for controlling the wireless power transfer system for optimal power transfer according to claim 1, the method comprising:
- a step (a) of calculating an operating range of a system resonance frequency variation value of a transmitter included in the wireless power transfer system;
- a step (b) of setting a driving resonance frequency start value of the transmitter and driving the transmitter using the resonance frequency start value;
- a step (c) of driving the transmitter, measuring an output voltage of the receiver, and comparing the measured output voltage with a predetermined receiver voltage reference value; and
- a step (d) of determining an optimal resonance frequency to perform driving while sequentially incrementing or decrementing a driving resonance frequency of the transmitter until a resonance frequency at a moment when the output voltage of the receiver becomes less than the voltage reference value is determined as an optimal resonance frequency when the output voltage of the receiver is greater than the voltage reference value.

8. The method according to claim 7, further comprising:
- a step (e) of measuring an output voltage of the receiver and a deviation of the output voltage by performing driving while sequentially inversely incrementing or decrementing a driving resonance frequency of the transmitter from the optimal resonance frequency determined in the step (d); and
- a step (f) of comparing the output deviation with a predetermined reference deviation.

9. The method according to claim 8, wherein, when the output deviation is greater than the reference deviation, a start value is set again, and the step (d) of driving the transmitter using the resonance frequency start value and subsequent steps are repeated.

10. The method according to claim 7, wherein a transmission current value is measured in the step (b) of sequentially driving the transmitter according to the frequency using the start value resonance frequency, an output current of the receiver is measured in the step (c), and whether transmission efficiency of the transmitter is maximum is determined in a process of comparing the output voltage of the receiver with the predetermined receiver voltage reference value.

* * * * *